United States Patent [19]

Kinoshita et al.

[11] 4,130,869
[45] Dec. 19, 1978

[54] MICROPROGRAM CONTROLLED SYSTEM

[75] Inventors: Tsuneo Kinoshita, Kokubunji; Isamu Yamazaki, Yokohama, both of Japan

[73] Assignee: Tokyo Shibaura Electric Co., Ltd., Kanagawa, Japan

[21] Appl. No.: 779,561

[22] Filed: Mar. 21, 1977

[30] Foreign Application Priority Data

Mar. 26, 1976 [JP] Japan .................................. 51-33184

[51] Int. Cl.² ............................................. G06F 9/16
[52] U.S. Cl. .................................................. 364/200
[58] Field of Search ... 364/200 MS File, 900 MS File

[56] References Cited

U.S. PATENT DOCUMENTS

| 3,947,821 | 3/1976 | Dalmasso | 364/200 |
|---|---|---|---|
| 3,990,052 | 11/1976 | Gruner | 364/200 |
| 4,015,245 | 3/1977 | Mercurio et al. | 364/200 |

Primary Examiner—Joseph M. Thesz
Attorney, Agent, or Firm—Oblon, Fisher, Spivak, McClelland & Maier

[57] ABSTRACT

A microprogram controlled system to which is applied the vertical type microprogramming technique. Microinstructions fetched from a control stage are decoded in a control decoder, which controls gates of registers in a central processor to execute the microinstructions. The microinstructions include an extension field in the format to modify the functions thereof.

28 Claims, 18 Drawing Figures

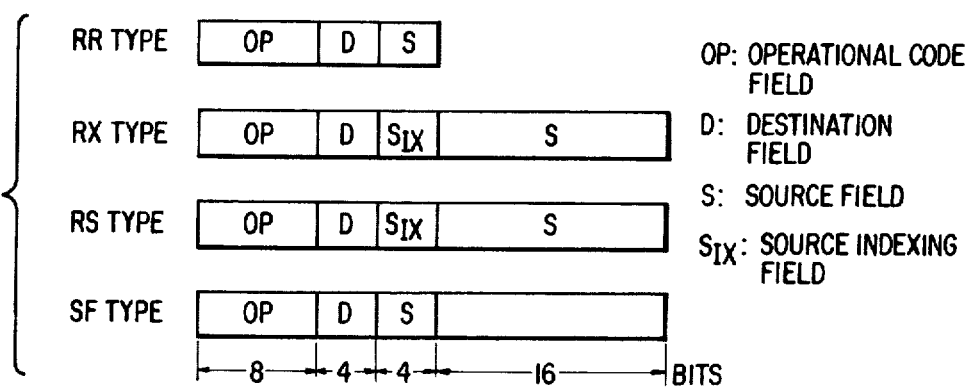
FIG. 3A
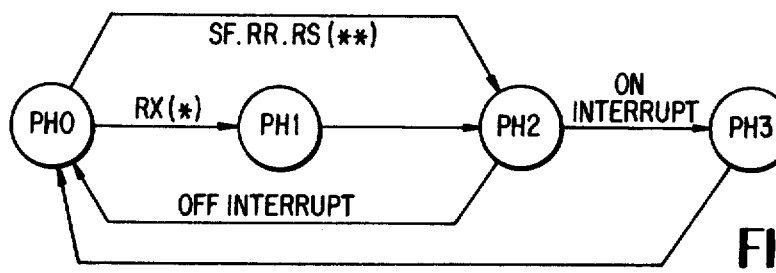
FIG. 3B
(*): EXCLUDE STH, BAL, BFC, & BTC INSTRUCTIONS
(**): INCLUDE  "   "    "    "    "
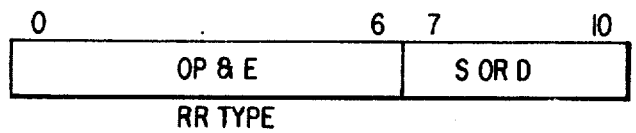
FIG. 4A — RR TYPE
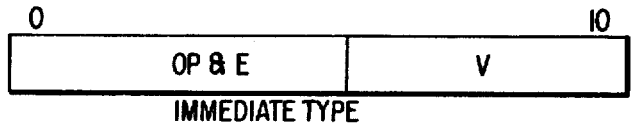
FIG. 4B — IMMEDIATE TYPE
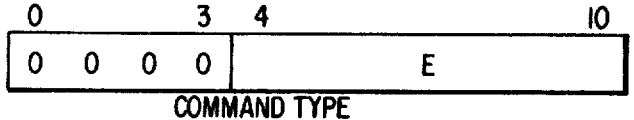
FIG. 4C — COMMAND TYPE
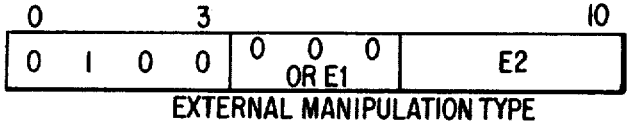
FIG. 4D — EXTERNAL MANIPULATION TYPE
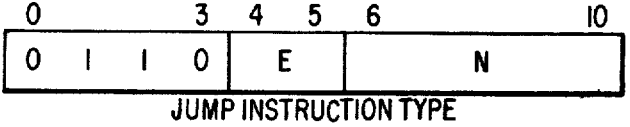
FIG. 4E — JUMP INSTRUCTION TYPE
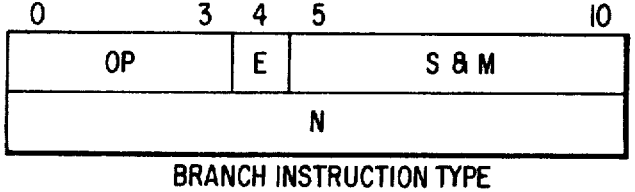
FIG. 4F — BRANCH INSTRUCTION TYPE

| TYPE | INSTRUCTION | FORMAT | ASSEMBLER DESCRIPTION |
|---|---|---|---|
| R-R | GIVE | `1 1 0 0 0 | E | D`  (0,5,7,10) | G xx, D |
| | LOAD | `1 1 0 0 1 | E | S`  (0,5,7,10) | L xx, S |
| | ADD | `1 0 0 | E | S`  (0,3,7,10) | A xxxx, S |
| | SUBTRACT | `1 1 1 | E | S`  (0,3,7,10) | S xxxx, S |
| | REVERSE SUBTRACT | `1 0 1 | E | S`  (0,3,7,10) | R xxxx, S |
| | AND | `1 1 0 1 0 1 | E | S`  (0,6,7,10) | N x, S |
| | OR | `1 1 0 1 1 1 | E | S`  (0,6,7,10) | O x, S |
| | EXCLUSIVE OR | `1 1 0 1 0 0 | E | S`  (0,6,7,10) | X x, S |
| | MARGE | `1 1 0 1 1 0 | E | S`  (0,6,7,10) | M x, S |
| BRANCH INSTRUCTION | TEST | `0 1 1 1 | E | M` / `N`  (0,4,5,10) | T x, MMMMMM, N |
| | BRANCH | `0 1 0 1 | E | S | M` / `N`  (0,4,5,7,10) | B x S, BBBB, N |
| JUMP INSTRUCTION | JUMP | `0 1 1 0 | E | N`  (0,4,6,10) | J x, N |
| IMMEDIATE | FILL | `0 0 0 1 0 | D | V`  (0,5,7,10) | F D, BBBB |
| | FILL CN | `0 0 0 1 1 | V`  (0,5,10) | F CN, V |
| | IMMEDIATE LOAD | `0 0 1 | V`  (0,3,10) | I V |
| COMMAND | COMMAND | `0 0 0 0 | E`  (0,4,10) | C E |
| EXTERNAL MANIPULATION | EXTERNAL REQUEST | `0 1 0 0 0 0 0 | E`  (0,7,10) | E E |
| | DECODE | `0 1 0 0 | E1 | E2`  (0,4,7,10) | D xxx, E2(E1+0) |

FIG. 5  
E: EXTENSION    S: SOURCE    D: DESTINATION  
N: NEXT ADDRESS    M---M: MASK PATTERN    B---B: BIT PATTERN

| CODE | SYMBOL | DESIGNATED REGISTER | CODE | SYMBOL | DESIGNATED REGISTER |
|---|---|---|---|---|---|
| 0 0 0 0 | NULL | NO DESIGNATION OR VALUE 0 | 0 1 1 1 | IR | INSTRUCTION REGISTER |
| 0 0 0 1 | LOC | LOCATION COUNTER | 1 0 0 0 | W0 | WORKING REGISTER #0 |
| 0 0 0 1 0 | CC | CONDITION CODE REGISTER | 1 0 0 1 | W1 | " " #1 |
| 1 0 0 1 0 | FLG | FLAG REGISTER | 1 0 1 0 | W2 | " " #2 |
| 0 0 1 1 | PSW | PROGRAM STATUS REGISTER | 1 0 1 1 | W3 | " " #3 |
| 0 1 0 0 | CN | COUNTER REGISTER | 1 1 0 0 | W4 | " " #4 |
| 0 0 1 0 1 | R1 | R1 FIELD IN INSTRUCTION REG. | 1 1 0 1 | YS | USER'S SOURCE REGISTER |
| 1 0 1 0 1 | R2 | R2 FIELD IN INSTRUCTION REG. | 1 1 1 0 | YDP1 | USER'S DESTINATION PLUS 1 REGISTER |
| 0 0 1 1 0 | PH | OP-CODE HIGH FIELD IN INSTRUCTION REG. | 1 1 1 1 | YD | USER'S DESTINATION REGISTER |
| 1 0 1 1 0 | PL | OP-CODE LOW FIELD IN INSTRUCTION REG. | | | |

FIG. 6

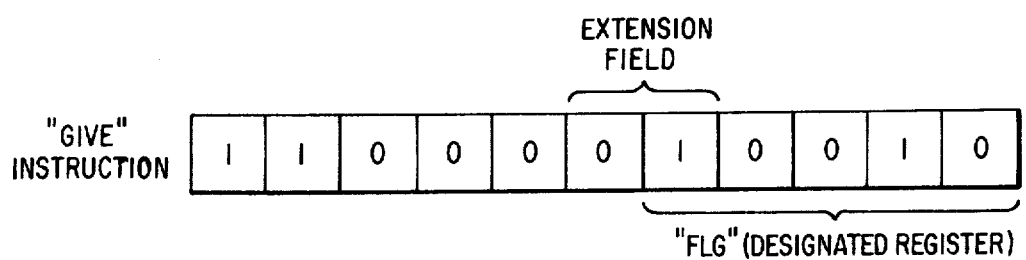

FIG. 7

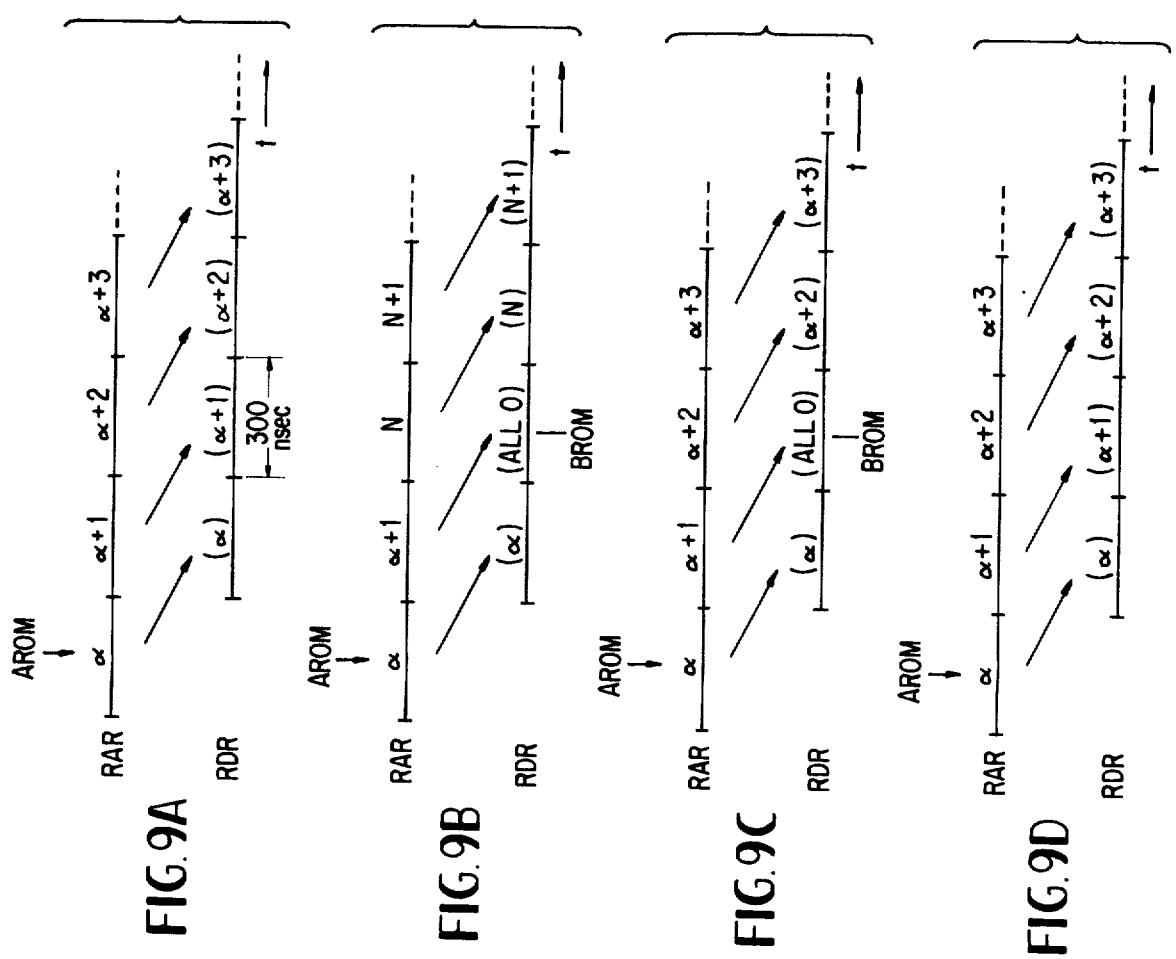

MICROPROGRAM CONTROLLED SYSTEM

BACKGROUND OF THE INVENTION

1. Field of the Invention

This invention relates to a data processing system and more particularly to a microprogram-controlled system.

2. Description of the Prior Art

In the digital computer and related fields, the use of microprogramming techniques to sequentially control the operation of logic gates in a digital computer system in accordance with a microprogram, is well known as an effective means which simplifies the control system and increase its flexibility and efficiency.

There are generally two different kinds of microprogramming techniques.

The first one is called a horizontal type microprogramming which is applied to a microprogram-controlled system in which each instruction word is relatively long and, thus, each bit of the word corresponds to the operation of the gates to be controlled in accordance with the microinstruction.

Another one is called a vertical type microprogramming technique which is applied to a microprogram-controlled system in which each instruction word is short and, thus, bit information is decoded in the computer.

In the former system, the microprogramming is extremely complicated because each instruction word is long and, in addition, it must be carried out by those who do not have sufficient knowledge of the hardware. On the other hand, the latter system needs the specified hardware to decode the many bit information although the microprogramming is comparatively easy to carry out. Therefore, the functions of the microinstructions are necessarily limited to simplified ones, and quite a number of microprogramming steps are necessary in the vertical type microprogram controlled system.

SUMMARY OF THE INVENTION

It is one object of the invention to provide a new and improved microprogram-controlled system to which the vertical type microprogramming technique is applied.

It is another object of the present invention to provide a microprogram-controlled system having significant operational performance.

It is a further object to provide a microprogram-controlled system having a high efficiency in the functions of the microinstructions.

It is a further object to provide a microprogram controlled system being capable of reducing the number of microprogramming steps.

The foregoing and other objects are attained in accordance with one aspect of the invention by providing a microprogram-controlled system which includes a control stage for storing microinstructions having an extension field in the format thereof, and a central processor for decoding and executing the microinstructions under the condition of modifying the function thereof in response to the extension field.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 3A shows macroinstruction formats, FIG. 3B shows a phase sequence diagram, FIGS. 4A-4F show microinstruction formats in accordance with this invention, FIG. 5 shows more detailed microinstruction formats in accordance with the invention, FIG. 6 shows a chart of codes which designate registers in the processor, FIG. 7 shows a microinstruction format to explain a relationship between an extension field and a designation field, FIG. 8 illustrates a memory allocation diagram for a control strage shown in FIG. 1, and FIGS. 9A-9D illustrate a flow diagram for execution of the microinstructions.

DETAILED DESCRIPTION OF THE PREFERRED EMBODIMENTS

Figure 1:
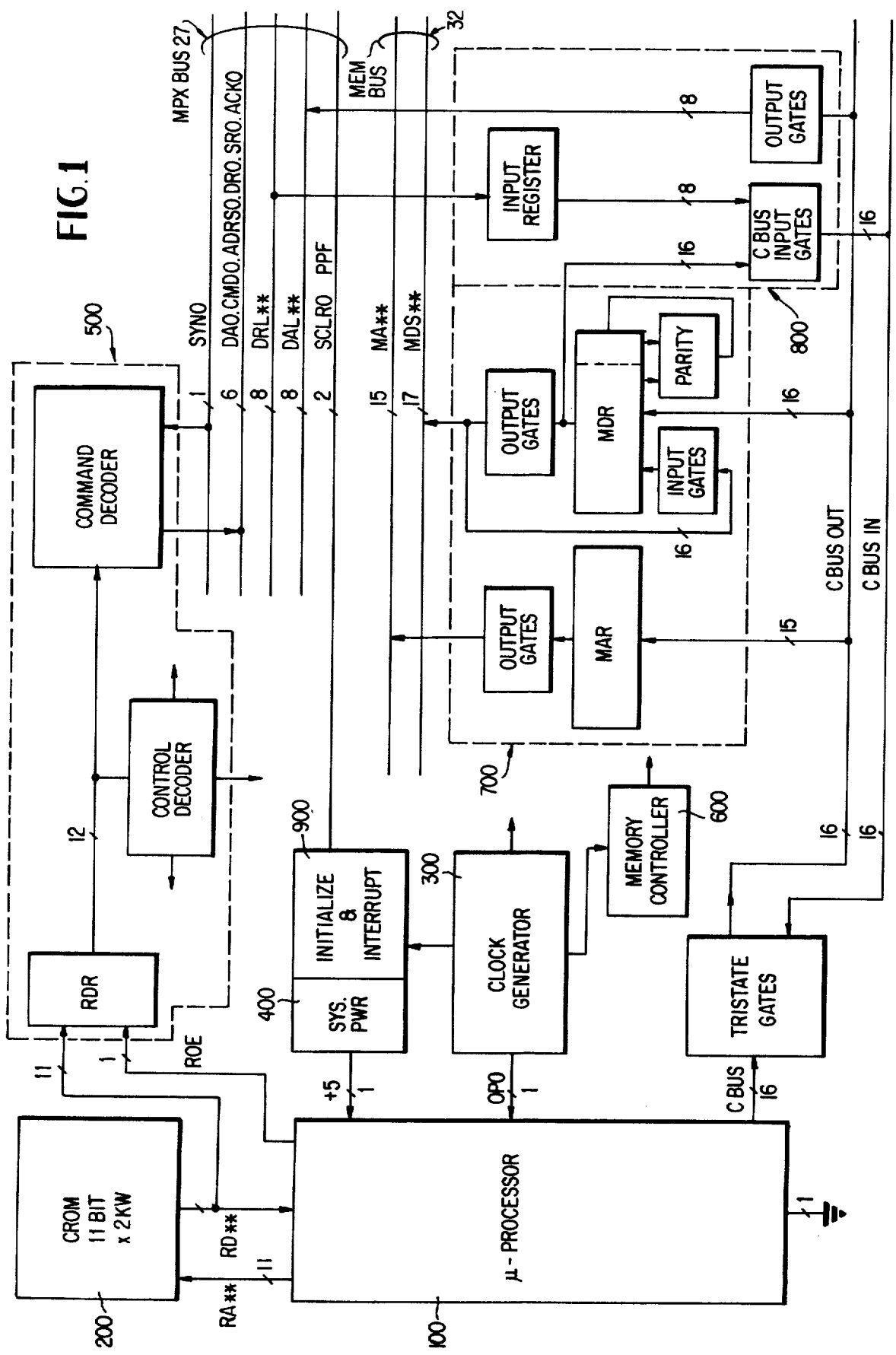
FIG. 1 shows a schematic block diagram of a data processing system adapted to implement the invention.

Referring now to the drawings, wherein like reference numerals designate identical or corresponding parts and more particularly to FIG. 1 thereof, the data processing system in accordance with the invention includes a main memory with 16 bits/one word and a multiplexer bus with 8 bits.

1. Configuration of the system.

The system comprises the following fundamental elements as shown in FIG. 1: a microprocessor or central processor 100, a control storage or read only memory (CROM) 200, a clock pulse generator 300, a system power source 400, a microinstruction decoder 500, a main memory controller 600, a memory address register/memory data register 700, an input/output controller 800, an interrupt/initialize circuit 900, and connecting busses. A standard data processing system further includes (not shown in FIG. 1) a main memory, I/O (input/output) devices, an operator console, and the like, as understood by those skilled in the art.

2. Microprocessor.

Figure 2:
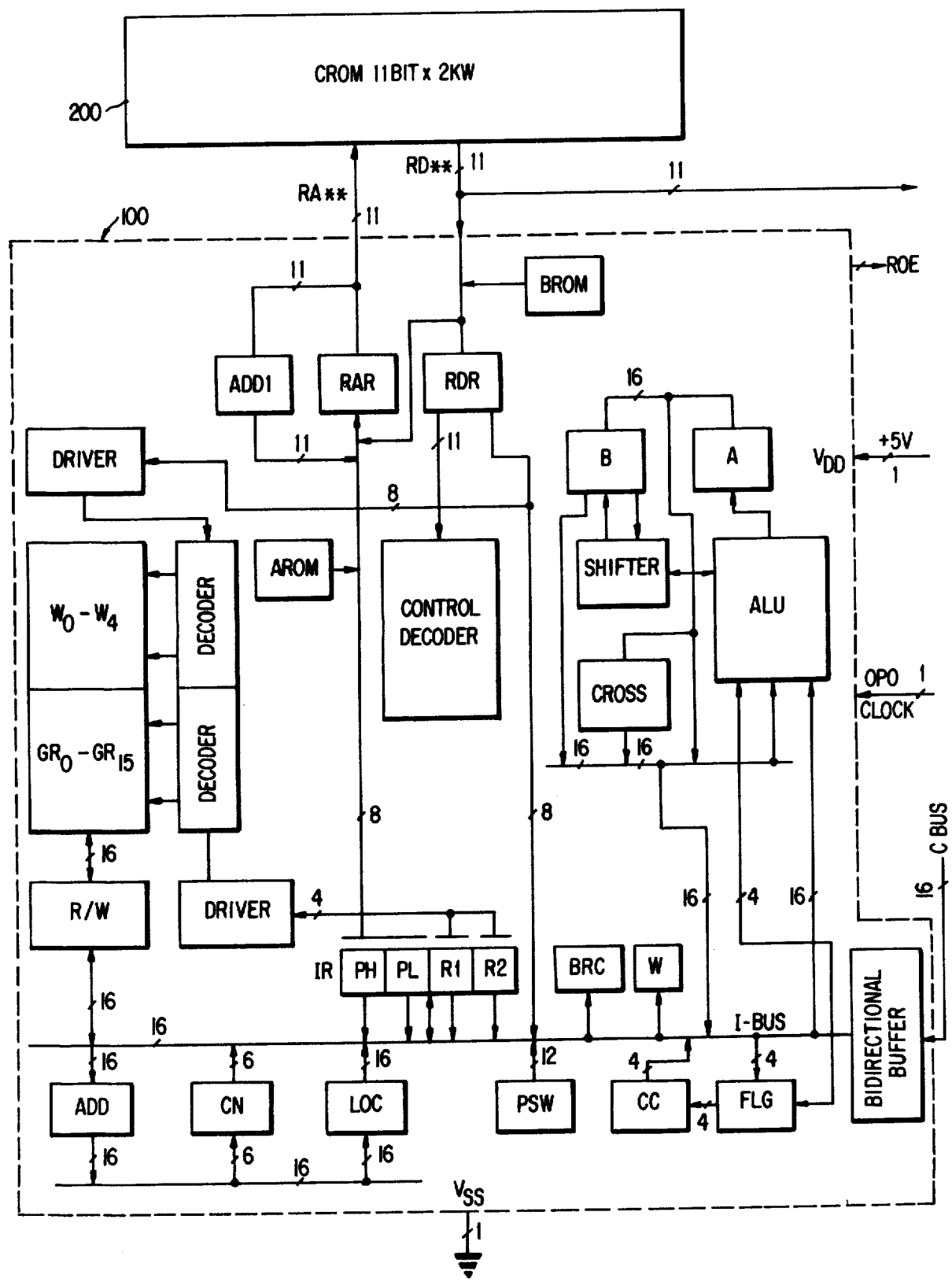
FIG. 2 shows a block diagram of an embodiment of the microprocessor shown in FIG. 1.

A block diagram of the microprocessor 100 is illustrated in FIG. 2. The microprocessor 100 is integrated on a one-chip semiconductor device by applying n-channel silicon gate E/D MOS technology thereto. A large scale integrated circuit (LSI) of the microprocessor comprises the following elements:

(1) Common Busses

The common bus which is produced on the semiconductor device 100 is designated as an internal bus (I-BUS). Another common bus which is connected with the I-BUS through a bi-directional buffer and is led out of the semiconductor device 100 is designated as a common bus (C-BUS). The I-BUS and C-BUS are bidirectional busses with 16 bits. Almost all control information signals in the microprocessor 100 are passed through the I-BUS, while all information signals are transferred between the microprocessor 100 and outer fields through the C-BUS.

(2) Arithmetic and Logic Unit

The arithmetic and logic unit (ALU) is a logic block which conducts parallel add/subtract operations with 16-bit data, logical operations and bit shift operations.

One of two inputs with 16-bit data or operands is supplied from an output of an A-register or a B-register to the ALU and another input is supplied from the I-BUS. Outputs of the ALU are always entered into the A-register.

The ALU is further connected with a flag register (FLG) whereby the contents of the FLG are changed in accordance with a result of operations of the ALU and they contribute to the operations.

(3) The A-register and the B-register

The A-register and the B-register are operation registers which function as an accumulator and as an auxiliary extended or quotient register, respectively, both of which comprise 16-bit registers.

The B-register includes the additional function of temporarily storing the contents of the A-register.

Almost all microinstructions relate to the manipulation of the A-register or the B-register and the operands thereof are supplied to one input of the ALU.

(4) General Registers and Working Registers

The general registers (GR) and the working registers (WR) comprise a plurality of 16-bit registers respectively, in which the GR comprise respectively 16 addressed registers (GR O-GR-15) designated by macroinstructions and 5 addressed registers (WRO-WR4) utilized by microinstructions.

The GR are selected by operands of R1 or R2 parts in an instruction register as hereinafter described.

When the GR are accessed by microinstructions, they are indirectly designated. Thus, when YD (User's Destination) and YS (User's Source) are designated by microinstructions, the contents of R1 and R2 are respectively sent to a decoder of the GR and the GR are selected in response to signals decoded by the internal control decoder.

However, when YDPI (YD Plus One) is designated by microinstruction, the contents of R1 are available for selection of the GR if they comprise an even number, while YDPI has the same effect as the designation YD of the contents of R1 comprise an odd number. (5) Instruction Register The instruction register (IR) is a 16-bit register which comprises an operation part with an operation code high field (PH), an operation code low field (PL) and a modifier field with a R1 field and a R2 field.

Full fields and each field of the IR can be designated respectively. When the IR is designated, 16-bit (bit positions 0-15) information of the I-BUS are transferred from or to IR. However, when each field (R1, R2, PH, or PL) is designated, 4-bit information on the I-BUS is transferred from or to the IR.

(6) Program Status Word Register

The program status word register (PSW) is a 12-bit register which stores control information with a microinstruction level. The function of each bit position is defined as follows:

TABLE 1

| Bit Position | Symbol | Function |
|---|---|---|
| 0 | WT | If this bit is ON a condition of CPU-WAIT is indicated. |
| 1 | EI | A mask interrupts from the peripheral devices. If it is ON, interrupts are allowable. |
| 2 | MM | A mask of CPU abnormal interrupts. If it is ON, the interrupts are allowable. |
| 3 | DF | A mask of interrupts of errors on divisional operations. If it is ON, the interrupts are allowable. |
| 4 | AS | If EI Λ AS is ON, automatic I/O services are executed. |
| 5 | FP | A mask of interrupts of errors on float- |

TABLE 1-continued

| Bit Position | Symbol | Function |
|---|---|---|
|  |  | ing point operations. If it is ON, the interrupts are accepted. |
| 7 | PM | A mask of interrupts on illegal memory protection. If it is ON, the interrupts are accepted. |
| 8-11 | φ | No used. |

(7) Location Counter and Counter Register

The location counter (LOC) and the counter register (CN) are respectively a 15-bit register and a 6-bit register. The LOC contains the address of the next macroinstruction to be executed. The CN counts the number of shifts during the shift operation and the contents thereof are added by 1 in a shift. The LOC partially shares the logic circuits with the CN.

(8) Condition Code Register, Flag Register

The condition code register (CC) is a 4-bit register which holds machine control information of the macroinstruction level. The flag register (FLG) comprises a 4-bit register which holds the machine control information of microinstruction level, and each bit therein contains the meanings as shown in the following Table 2.

TABLE 2

| Bit Position | Symbol | Meaning |
|---|---|---|
| 0 | C | Carry bit |
| 1 | V | Overflow Bit |
| 2 | G | Greater bit |
| 3 | L | Lower bit |

The contents of the FLG are stored in the CC after executing one microinstruction in a series of microinstructions.

(9) ROM Address Register

The ROM address register (RAR) comprises an 11-bit register which holds the address of the next microinstruction to be executed.

(10) ROM Data Register

The ROM data register (RDR) comprises an 11-bit register which holds a microinstruction to be executed.

The address of the CROM is designated by the RAR, and the contents thereof fetched from CROM are held in the RDR.

(11) AROM, BROM

The AROM and BROM are read only memories which have the capacity of 5 words (11 bits/one word) respectively.

The AROM stores the specific start addresses of the CROM as follows:

TABLE 3

| Address of AROM | Start Address of CROM stored in AROM |
|---|---|
| 0 | Start address of illegal instructions trap |
| 1 | Start address of initialization trap |
| 2 | Start address for phase 0 |
| 3 | Start address for phase 1 |
| 4 | Start address for phase 2 |

The BROM stores auxiliary instructions for execution of the BRANCH instruction and the like as follows:

TABLE 4

| Address of BROM | Auxiliary microinstruction stored in the BROM ("Assembler" Expression) |
|---|---|
| 0 | Instruction for giving a result to a destination register in the GR. ("G...., YD") |
| 1 | Instruction for clearing the contents of the A-register. ("LB., NULL") |
| 2 | Instruction for loading the contents of a source register in the GR to the A-register. ("L...., YS") |
| 3 | Instruction for loading the masked contents of the R2 to the A-register. ("L, M, R2") |
| 4 | No-operation ("CN") |

(12) W flip-flop

The W flip-flop stores the least significant bit on the C-BUS when the 16-bit address is transmitted from the microprocessor 100 to the MAR.

At the execution of the microinstruction "CW" (Exchange by W), the exchange is determined in accordance with the contents of the W flip-flop.

(13) Branch Control Flip-Flop

The branch control flip-flop is a circuit which executes the branch operation in response to the contents of the last 6-bit or 4-bit information on the I-BUS at the branch operations of BRANCH, TEST, JUMP and SHIFT.

(14) ROM Output Effective Terminal

A control signal for the microinstruction decoder 500 is derived from the ROM output effective (ROE) terminal. This signal is provided from the control decoder in the microprocessor 100 and it is used for the decoder 500 to examine whether it is effective or not.

(15) Control Decoder

The control decoder in the microprocessor 100 decodes the microinstructions so as to provide various registers with control signals in order to execute the microinstructions. The decoder comprises a MOS transistor matrix and control lines thereof in the microprocessor 100 are not shown in FIG. 2.

3. Interfaces between the microprocessor and the outer field thereof.

There are seven types of paths for connecting the microprocessor 100 and the devices located outside thereof as shown in FIG. 1;

| 1) | C-BUS | 16 bits |
| 2) | RD** | 11 bits |
| 3) | RA** | 11 bits |
| 4) | OPO(CLOCK) | 1 bit |
| 5) | POWER (+5V) | 1 bit |
| 6) | GND (GROUND) | 1 bit |
| 7) | ROE | 1 bit |

Detailed Description of the Interfaces (1) C-BUS

The C-BUS with 16-bits is a bidirectional bus which is connected with the outer devices through logic circuits in order to function as a TTL level bus. The bus is divided into C-BUS inputs and C-BUS outputs through tri-state gates (not shown). The tri-state gates are for switching the C-BUS inputs to the C-BUS outputs and vice versa in response to an access control signal to the main memory which is generated after the microprocessor 100 and DMA channel (not shown) determine access to the main memory.

(2) Main Memory Address Information

The address information with 15-bits is sent to the memory address register (MAR) through the C-BUS. The least significant digit is stored in the W flip-flop in the microprocessor 100 so that higher 15-bit address information is transferred to the MAR. The MAR comprises NAND gates and D flip-flop circuits wherein flip-flop circuits store the information on the C-BUS when the MAR is selected as a destination register by microinstructions on the semiconductor device. When the processor 100, not the DMA channel, is selected, communications between the memory bus and the MAR are available.

(3) Memory Data Information

Data transferred from the main memory are latched in memory data register (MDR). The memory data information comprises 17-bits including parity information.

Parity signals in the memory data are generated at the processor 100.

(4) Interrupts

In the data processing system, the following events can be accepted as external interrupts:

| ATN: | Interrupt for service requests from the I/O devices. |
| CATN: | Interrupts for service requests from the console switches. |
| SINGL: | Requests for execution of a single step mode. |
| PPF: | Interrupts of primary power failure. |
| MPE: | Interrupts of memory parity error. |

These five types of signals are partially AND-operated with an interrupt mask field of PSW, namely PSW (01), PSW (02), to produce interrupt signals of "ITR". The "ITR" signals are as follows: ITR = PSW (01) × ATN+CATN+SNGL + PPF+PSW (02) × MPE The "ITR" signals are supplied to the microprocessor 100 through the least significant bit of the C-BUS in response to a predetermined microinstruction which is issued at the last timing of a microinstruction interpretation/execution cycle (Phase 2). If there are any interrupts, the control sequence is switched to the execution cycle of the interrupt sequence (Phase 3) instead of to a microinstruction fetch cycle.

(5) Detection of Interrupts

Six kinds of external interrupts including an automatic restart ("ASRT" signal) in addition to the above-identified interrupts can be detected in this data processing system.

The detection is conducted in response to a predetermined microinstruction.

When this microinstruction is executed, signals of external interrupts are introduced into the microprocessor 100 through the C-BUS.

Then, detection neglect of the external interrupts is identified in accordance with maskbits in the PSW register. After detection of the interrupts, branch operation toward the predetermined address of CROM is initiated.

(6) Communication with I/O devices.

Microinstructions controlling the communication with I/O devices are shown in Table 5.

TABLE 5

| Microinstruction | Function |
|---|---|
| E DAO | Output data with 8-bits to I/O devices |
| E CMD | Send commands to I/O devices |
| E ADRS | Send an address to I/O devices |
| E DAI | Input data with 8-bits to the |

TABLE 5-continued

| Microinstruction | Function |
|---|---|
| | microprocessor |
| E STA | Read status-data with 8-bits of I/O devices |
| E ACK | Read an address of I/O devices requesting for services. |

The communication of the microprocessor 100 with the I/O devices is conducted through the C-BUS and the MPX-BUX logic circuits for output from the C-BUS to the MPX-BUS.

(7) Control ROM.

The sequence of logical operations in the microprocessor 100 is stored in a control ROM or control storage (CROM) in the form of a microprogram, a set of microinstructions, which is located outside the microprocessor 100. The CROM is connected with the microprocessor 100 through the ROM address lines and the ROM data lines.

The capacity of the CROM is 2K words (11 bits/one word) in this embodiment, but it can be expanded to 4K words. The CROM comprises, for example, a bipolar ROM with 3×8 chips, wherein each ROM is 4 bits × 256 words/one chip and the chip-selection and the word-selection in the ROM chip are made through the ROM address lines.

(8) Clock pulse Generator

The microprocessor 100 operates in accordance with the clock pulse signals.

A clock pulse generator 300 includes a quartz oscillator with an oscillation frequency of 10MHz and a ternary counter. The oscillator generates a signal of pulse duration of 100 nsec. and the ternary counter counts down the signal to produce an output signal of the clock pulse generator 300 which is a pulse train of pulse width of 50 nsec. of pulse duration 300 nsec.

(9) Power Source for Logic Circuits

The microprocessor 100 is energized by the power source supplying +5V and the reference (ground) potential.

The initialization of the microprocessor 100 is conducted at the energizing timing of +5V from the power source in order to minimize the number of external terminals of the semiconductor chip. At the initialization of the microprocessor 100, the start address of the microinstruction "Initialize Routine" is read out from the AROM to the RAR and the microinstruction "No-Operation" is also read out from the BROM to the RDR.

4. Flow of Control

The flow of control in this data processing system is determined by the microprogram stored in the CROM.

The flow of control comprises four phases as follows;

Phase 0 — Read cycle of macroinstruction from the main memory and classification of the macroinstruction.

Phase 1 — Calculation cycle of an operand address, an index-modification cycle thereof, and a fetch cycle of the operand from the index-modified address.

Phase 2 — Read cycle of a microinstruction train from the CROM 200 in response to a predetermined macroinstruction and execution of the microsteps.

Phase 3 — Interrupt handling cycle at the presence of events of the interrupt.

The macroinstructions are classified as follows:

RR type — The macroinstructions include two operands to the GR.

RX type — The macroinstructions include an operand of the source for an address of the main memory and another operand of the destination for the GR.

RS type — The macroinstructions include an operand of the source for immediate data which are allowable to index-modify, and another operand of the source for the GR.

SF type — The macroinstructions include an operand of the source for one-byte immediate data and another operand of the destination for the GR.

The classification of these macroinstruction and the transfer diagram between the phases are respectively shown in FIGS. 3A and 3B.

5. Microinstructions

Microinstructions stored in the control stage of the CROM 200 comprise one-word instructions and two-word instructions in which each one-word thereof contains 11 bits.

One instruction of the microinstructions is executed in parallel with the fetch to the next instruction. The executing timing is assigned to one step of the microprogram in a clock pulse.

(1) The functional classifications of the microinstructions are shown in FIGS. 4A–4F in which OP, E, S, DV, M, and N represent respectively, operation fields, extension fields, source register code fields, destination register code fields, data fields, mask fields, and jump addresses.

(a) RR (Register to Register) type

The microinstruction of this type as shown in FIG. 4A have functions that a result of operation between the first operand of the contents of A-register or B-register and the second operand of those of source register is stored in A-register. Following microinstructions belong to this type; "LOAD", "GIVE", "ADD", "SUBSTRACT", "REVERSE SUBSTRACT", "AND", "OR", "EXCLUSIVE OR", and "MARGE", wherein "GIVE" means, shown in FIG. 5, that the operand is given to the destination register, namely, the contents of A-register or B-register are stored in the destination register.

(b) Immediate type

The microinstructions of immediate type as shown in FIG. 4B have functions that data of V field are stored in the destination register, which are following instructions; "FILL", "FILL CN", and "IMMEDIATE LOAD", shown in FIG. 5, wherein FILL CN means that data of V field are stored in the counter register and "IMMEDIATE LOAD" means that data of V field are stored in the A-register.

(c) Command type

The microinstructions of command type as shown in FIG. 4C have functions that byte data are exchanged in the A-register, and shift operations are executed in the A-register and the B-register.

(d) External manipulation type

The microinstructions of this type as shown in FIG. 4D have functions that data transferes are executed between the microprocessor and one of MAR, MDR, and the I/O devices, and operations of write and read of the main memory are executed, which are "EXTERNAL REQUEST" and "DECODE", shown in FIG. 15.

(e) Branch type

Branch instructions as shown in FIGS. 4E and 4F have functions that if conditions indicated in E fields are accepted, jump operation to the addresses of N in the control storage are executed. The microinstructions of this type are one-word instruction of JUMP and two-word instructions of TEST and BRANCH.

When the conditions are satisfied, it takes two microsteps for the execution of branch instructions. However, when the conditions are not satisfied, the one-word instruction takes one micro-step and the two-word instructions take two micro-steps. If "Jump on Privilege" instruction is designated in the microinstructions of "COMMAND", then it is treated as the one-word branch instruction.

(2) Formats of micro-instructions

Formats of microinstructions are shown in FIG. 5. According to this data processing system, 16 registers may be designated as the source and destination register.

The designation codes are shown in FIG. 6 in which those of CC, FLG, R1, R2, PH, and PL comprise 5 bits while the others comprise 4 bits. The most significant bit of 5-bit source and destination codes is common to a part of the extension codes in order to effectively use the contents thereof as follows: The instruction of "GIVE", for example, shown in FIG. 7 includes an extension-code field with 2 bit and a destination-code field with 4 bits of the registers. When the extension code is "01" and the destination code is apparently "0010", the first "1" is coupled with the destination code, as the most significant bit thereof, to be "10010", so that the actual destination register is regarded as the FLG (flag register). However, if the extension code is "00" and the destination code is "0010", then the actual destination register may be regarded as the CC (counter register) because of the destination code coupled with the least significant digit of the extension code of "00010". The same interpretation is applied to the identification between R1 and R2, and between PH and PL. YS, YD and YDP1 are indirectly designated through corresponding fields of IR (instruction register), as follows: YS designates the contents of R2.

YS→(R2)

YD designates the contents of R1.

YD→(R1)

If the contents of R1 are even number, then YDP1 designates the contents of R1+1. But if those of R1 are odd number, then YDP1 designates the contents of R1.

| YDP1 | (R1 + 1) | ; | (R1) are even number. |
|------|----------|---|----------------------|
|      | (R1)     | ; | (R1) are odd number. |

If NULL is designated as the source register, then the value of the second operand becomes zero. However, if it is designated as the destination register, then the result of operation is not stored in any register, namely, it is equivalent to no-operation.

The registers designated by the destination field in FILL instruction and by the source field in "BRANCH" instruction are one of the registers shown in the following Table 6.

TABLE 6

| Code | Symbol | Register |
|------|--------|----------|
| 00   | C      | CC       |
| 01   | F      | FLG      |
| 10   | H      | PH       |

TABLE 6-continued

| Code | Symbol | Register |
|------|--------|----------|
| 11   | L      | PL       |

(3) Control storage (CROM) allocation

The contents of the microprograms stored in the CROM 200 are shown in FIG. 8.

The start addresses of phase 2 are stored from X'000' to X'OFF'. When phase 0 or phase 1 is shifted to phase 2 in response to DECODE instructions, the contents of phase 2 are read out and entered into the RAR. In this case, machine instruction codes (upper 8-bits of IR) are used for the addresses. If the machine instructions are illegal, the contents designate the address of X'100' and the control is shifted to phase 3 from X'100' because the contents stored at the address of X'100' and X'101' comprise an illegal instruction trap.

At the power-on or initialized operation on the console, the RAR in the microprocessor 100 receives an address of X'102'. The contents of the address of X'102' contain the branch instruction for the initialization routine. The contents of the addresses of X'104' and X'105' comprise a routine of phase 0. The contents of addresses of X'106' and X'107' comprise a routine of phase 1 which is accessed by the macroinstructions of the RX type except for Store Halfword (STH), Branch and Link (BAL), Branch on False Condition (BFC), and Branch on True Condition (BTC) as shown in FIG. 3B.

When the other macroinstructions, such as SF type, RR type, RS type and RX type of STH, BAL, BFC, and BTC are accessed, the control of phases is shifted from phase 0 to phase 2. However, when the interrupt occurs, it is shifted to phase 3 after the completion of phase 2. A routine for interrupt is stored in addresses from X'108' to X'10D'. After the step of X'10D' is finished, the control of the phase is returned to phase 1 through a final step stored at X'103'. Routines for execution of phase 2 and 3 are stored in addresses from X'10E' to X'68C'. The remaining area in the control storage 200 is a spare area.

It may be noted, as mentioned above, in connection with the microinstruction that the start addresses of specific microinstructions are stored in the AROM and auxiliary microinstructions are also stored in the BROM.

(4) Flow of execution of microinstructions (a) Flow without branch operation

The contents of the RAR are always supplied to the address input terminals of the CROM 200. After the lapse of the predetermined access time, for example 300 nsec., information read out from the CROM 200 is stored at the RDR. Concurrently, the contents of the RAR are added by one through ADD1 as shown in FIG. 2 which designates the next address of the microinstruction in response to the clock pulse. In the conventional flow of the execution of microinstructions without branch instructions, the RAR stores the next address $\alpha+1$ of the microinstruction to be executed and the RDR stores the current information ($\alpha$) of the microinstruction as shown in FIG. 9A.

(b) Flow with branch operation

Two microsteps are required for branch instructions to be executed at acceptance of conditions as shown in FIG. 9B.

In this case, the auxiliary microinstruction "NO OPERATION" (= all zero) from the BROM is inserted into the RDR where N represents a jumping address and N for Jump on Privilege is X'100'.

However, when the branch conditions are not accepted, two-word branch instructions (BRANCH and TEST) take the two microsteps as shown in FIG. 9C because one is added to the contents of RAR while the one-word branch instructions JUMP and Jump on Privilege) are the same as flow without the branch operation as shwon in FIG. 9D.

(6) Function of Microinstruction

The central processing unit 100 is controlled by microprograms stored in the control storage each of which is hereinafter explained with reference to FIGS. 2, 5 and 6. At the execution of microprogram, the microinstruction fetched from the control storage to the RDR is decoded in the control decoder so as to control the operation of the predetermined gates in the elements of the processor 100.

(1) GIVE instruction

The "GIVE" instruction comprises an operation code of "11000", a 2-bit extension (E) field and a 4-bit destination (D) field as shown in FIG. 5.

The D field designates one of the destination (D) registers shown in FIG. 6 so that the contents of the A-register or B-register are given to the destination register through the I-BUS.

The functions of the "GIVE" instruction, however, are modified by the E field as shown in following Table 7.

TABLE 7

| E field | | |
|---|---|---|
| Notation | | Function / Meaning |
| 00 | A(0 = 15)→D(0:15) | The full contents of the A-register are given to the D (destination) register. |
| 01 | A(8 = 15)→D(8 = 15) and 0→D(0 = 7) | The lower 8 bits of the A-register are given to those of the D register and "0" is given to the higher 8 bits thereof. |
| 10 | B(0 = 15)→D(0 = 15) and A(0 = 15)→B(0 = 15) | The full contents of the B-register are given to the D-register, and then those of the A register are given to the B-register. |
| 11 | B(8 = 15)→D(8 = 15) 0→D(0 = 7) and A(0 = 15)→B(0 = 15) | The lower 8 bits of the B-register are given to those of the D register while "0" is given to the higher 8 bits of the D register, and then the full contents of the A-register 18 are given to the B-register. |

When either the CC condition code register, or the R1 field and PL field of the IR instruction register is designated as a destination register at the execution of the "GIVE" intruction, the contents of the E field must be "01" or "11", an the functions thereof be ones shown in the Table 7 because the second bit of the E field is commonly used for the modifier and as part of the designation of the destination register. However, as these registers comprise 4 bits, no problem occurs in this system.

The content of the FLG (flag register) does not change unless it is designated as a destination register.

(2) LOAD instruction

The "LOAD" instruction comprises an operation code of "11001", a 2-bit extension (E) field, and a 4-bit source (S) field.

The contents of a source (S) register designated by the S field are loaded to the A-register.

The functions of "LOAD" instruction which are modified by the E field are shown in following Table 8.

TABLE 8

| E field | | |
|---|---|---|
| Notation | | Meaning |
| 00 | S(0 = 15)→A(0 = 15) | The contents of the S register are loaded to the A-register |
| 01 | S(8 = 15)→A(8 = 15) and "0"→A(0 = 7) | The lower 8 bits of the S register are loaded to those of the A-register and "0" is loaded to the higher 8-bit of the A-register |
| 10 | A(0 = 15)→B(0 = 15) and then S(0 = 15)→A(0 = 15) | The contents of the A-register are loaded to the B-register, and then those of the S register are loaded to the A-register |
| 11 | A(0 = 15)→B(0 = 15) S(8 = 15)→A(8 = 15) and "0"→A(0 = 17) | After the contents of the A-register are loaded to the B-register, the lower 8 bits of the S register are loaded to those of the A-register and "0" is loaded to the higher 8-bits thereof. |

(3) ADD instruction

The "ADD" instruction comprises an operation code of "100", a 4-bit extension (E) field and a 4-bit source (S) field.

The contents of a source (S) register designated by the S field are added to those of the A-register or the B-register, and then a result thereof is stored in the A-register. At the execution of the ADD instruction, the output gate of the S register is enabled to transfer the data thereof to the second operand of the ALU through the I-BUS, while the contents of the A-register or the B-register are provided to the first operand of the ALU through the output gates of the A-register or the B-register and the I-BUS.

Then, the "ADD" operation is conducted in the ALU and a result thereof is supplied to the A-register through the output gate of the ALU. The functions of the "ADD" instruction are modified in accordance with the E field. When the first bit of the E field is "0", the "ADD" operation is executed and a result thereof is stored in the A-register. However, when i, is "1", the output gate of the ALU is desabled and, thus, the result thereof cannot be obtained unless the L (less than "0") bit of the FLG is equal to "1". When the second bit of the E field is equal to "0", the output gate of the C (carry) bit in the FLG is desabled. Therefore, the "ADD" operation is executed except for the contents of the C bit. On the other hand, when it is equal to "1" the "ADD" operation including the contents of the C bit is executed.

When the third bit of the E field is equal to "0", the output gate of the A-register is enabled in order to transfer the contents thereof to the first operand of the ALU through the I-BUS. But when it is equal to "1", the output gate of the B-register is enabled so that the contents thereof are supplied to the first operand of the ALU through the I-BUS. After the "ADD" operation, a result thereof is stored in the A-register and the previous contents of the A-register is supplied to the B-register.

When the fourth bit of the E field is equal to "0", the input gate of the G and the L bits in the FLG are desabled and, thus, the contents thereof are not changed.

When it is equal to "1", the input gate is enabled so that the contents of the G (greater than "0") and the L (less than "0") bits are changed in accordance with the adding result. In addition, the C (carry) and the V (overflow) bits are changed in response to the adding result unless "NULL" (See FIG. 6) is designated as the S register.

The functions modified by the E field of the "ADD" instruction are shown in following Table 9.

TABLE 9

| E Field | Function |
|---------|----------|
| 0XXX | The "ADD" operation is executed |
| 1XXX | The "ADD" operation is executed only if the L bit of the FLG is equal to "1" |
| X0XX | The "ADD" operation is executed except the C bit of the FLG |
| X1XX | The "ADD" operation including the C bit of the FLG is executed. |
| XX0X | The contents of the S register are added to those of the A-register, and then a result thereof is stored in the A-register; (S) + (A)→(A) |
| XX1X | After the contents of the S register are added to those of the A-register, a result thereof is stored in the A-register and the previous contents thereof are stored in the B-register; (S) + (A)→(A), and previous (A)→(B) |
| XXX0 | The contents of the G and the L bits in the FLG are not changed after the "ADD" operation |
| XXX1 | The contents of the G and the L bits in the FLG are changed in response to the adding result. |

Note: X represents a value of "0" or "1".

(4) SUBSTRACT instruction

The "SUBTRACT" instruction comprises an operation code of "111", a 4-bit extension (E) field, and a 4-bit source (S) field, which is substantially the same as the "ADD" instruction except the execution of the "SUBTRACT" operation in the ALU.

The functions of the "SUBTRACT" instruction are modified in accordance with the E field thereof, as shown in following Table 10.

TABLE 10

| E Field | Function |
|---------|----------|
| 0XXX | The "SUBTRACT" operation is always executed. |
| 1XXX | The "SUBTRACT" operation is executed only if the L bit of the FLG is equal to "1". |
| X0XX | The "SUBTRACT" operation is executed except the C bit of FLG |
| X1XX | The "SUBTRACT" operation including the C bit of the FLG is executed. |
| XX0X | The contents of the A-register are subtracted from those of the source register and then a result thereof is stored in the A-register; (A)-(S)→(A) |
| XX1X | The contents of the A-register are subtracted from those of the S-register, and then a result thereof is stored in the A-register while the previous contents of the A-register are stored in the B-register; (A)-(S)→(A) and (A) previous→(B) |
| XXX0 | The contents of the G and the L bits in the FLG are not changed after the "SUBTRACT" operation. |
| XXX1 | The contents of the G and the L bits in the FLG 14 are changed in accordance with the subtracting operation. |

Note; X represents a value of "0" or "1".

(5) REVERSE SUBTRACT Instruction

The "REVERSE SUBTRACTION" instruction comprises an operation code of "101", a 4-bit extension (E) field, and a 4-bit source (S) field.

At the execution of the "REVERSE" instruction, the contents of the source register designated by the S field is subtracted from those of the A-register or the B register, and then a result thereof is stored in A-register.

The other functions of the "REVERSE SUBTRACTION" instruction is substantially the same as the "SUBTRACTION" instruction.

(6) AND instruction

The "AND" instruction comprises an operation code of "110101", a 1-bit extension (E) field, and a 4-bit source field.

When the "AND" instruction is executed, the output gate of the source register designated by the S field and that of A-register are enabled so that the contents of the source register and the A-register are supplied to the ALU through the I-BUS as the first and the second operands, respectively, and a result of the "AND" operation in the ALU is stored in the A-register through the output gate of the ALU.

The E field functions as shown in Table 11.

TABLE 11

| E Field | Function |
|---------|----------|
| 0 | The contents of the FLG are not changed |
| 1 | Although the C (carry) and the V (overflow) bits of the FLG are not changed, the G (greater than "0") and the L (less than "0") bits thereof are changed as follows; G, L  Meaning  0, 0  The result is "0"  0, 1  The result is "negative"  1, 0  The result is "positive" |

(7) OR instruction

The "OR" instruction comprises an operation code of "110111", a 1-bit extension (E) field, and 4-bit source (S) field.

The "OR" instruction is substantially the same as the "AND" instruction except the "OR" operation in the ALU.

(8) MARGE instruction

The "MARGE" instruction comprises an operation code of "110110", a 1-bit extension (E) field, and a 4-bit source (S) field.

When the "MARGE" is executed the output gates of the source register designated by the S field and the A-register are enabled so that the contents thereof are respectively supplied to the ALU through the I-BUS as the first and the second operands of the ALU.

When the E field is "0", the lower 8-bit data of the first operand and the higher 8-bit data of the second operand are respectively provided to the corresponding bit positions of the A-register through the output gate of the ALU.

However, when the E field is "1", the lower 8-bit data of the first operand and the lower 8-bit data of the second operand, namely those of the A-register, are respectively supplied to the A-register through the output gate of the ALU, and the contents of FLG are changed as well as at the execution of the "AND" instruction.

Following Table 12 shows the modification of the functions in accordance with the E field.

TABLE 12

| E Field | Function |
|---------|----------|
| 0 | The lower 8 bits of the source register are stored in those of the A-register and the higher 8-bit of the A-register and the contents of the FLG are not changed; S (8 = 15)→A(8 = 15) |
| 1 | The lower 8 bits of the source register and the previous lower 8 bits are respectively stored in the lower 8 bits and the higher |

TABLE 12-continued

| E Field | Function |
|---|---|
| | 8 bit of the A register;<br>S(8 = 15)→A(8 = 15)<br>S(8 = 15) previous→A(0 = 7)<br>and the contents of the FLG are<br>changed as well as at the execution<br>of the "AND" instruction (See<br>Table 11) |

(10) TEST instruction

The "TEST" instruction comprises 2 words, where the first word includes an operation code of "0111", and 1-bit extension (E) field and a 6-bit mask field, and the second word includes a jump address (N) field. When the "TEST" instruction is executed, 6-bit data and the mask-bit information are, respectively, supplied to the first and the second operands of the ALU through the I-BUS, where a logical multiplication between the operands is conducted on a bit-by-bit basis.

The data comprises interrupt signals including an attention signal (ATN), a console attention signal (CATN), a single instruction signal (SNGL), an automatic restart (ARST) signal, a primary power fail (PPF) signal and a memory parity error (MPE) signal. If a result of multiplication is equal to all "0", it is referred to as FALSE. If at least one bit thereof is equal to "1", it is referred to as TRUE.

When the E field is equal to "0" and the result of multiplication is FALSE, the data of the N field are loaded to the RAR in order to branch. However, when the E field is equal to "1" and the result is TRUE, the contents of RAR are increased by "1" through the ADD.

Further, when the E field is equal to "1", the reverse operation is executed. Namely, if the result if FALSE, then the contents of the RAR are increased by "1" through the ADD1. If it is TRUE, then the data of the N field are loaded to the RAR.

The functions of the E field are shown in a following Table 13.

TABLE 13

| E Field | TRUE/FALSE | Function |
|---|---|---|
| 0 | TRUE | The contents of the RAR are added by "1";<br>(RAR) + 1 → (RAR) |
| | FALSE | The data of the N field are loaded to the RAR;<br>N → (RAR) |
| 1 | TRUE | The data of the N field are loaded to the RAR; N→(RAR) |
| | FALSE | The contents of the RAR are loaded by "1";<br>(RAR) + 1 → (RAR) |

Thus, it takes two microsteps to execute the "TEST" instruction. In respose to the next clock signal generated after decoding the first word of the "TEST" instruction, all "0" are loaded to the RDR from the BROM so as to read a next microinstruction.

(11) BRANCH instruction

The "BRANCH" instruction comprises two words, in which the first work includes an operation code of "0101", a 1-bit extension (E) field, a 2-bit source (S) field and a 4-bit mask (M) field, and the second word includes a 11-bit jump address of "N". When the "BRANCH" instruction is executed, the contents of the source register designated by the S field and the mask information are respectively supplied to the first and the second operands of the ALU through the I-BUS.

The contents of the source register may be designated by only one of CC, FLG, PH or PL of the IR in accordance with the contents of the source field of "00", "01", "10" and "11".

A logical multiplication between operands is conducted on a bit-by-bit basis. When the result thereof is equal to all "0", it is referred to as FALSE. When at least one bit is equal to "1", it is referred to as TRUE.

Further when the E field is equal to "0" under the FALSE condition, the data of the jump address field are loaded to the RAR.

However, when it is equal to "0" under the TRUE condition, the contents of the RAR are increased by "1" through the ADD1. When the E field is equal to "1", the operations to the RAR are reversed to those thereto in case that the E field is equal to "0". Therefore, the "BRANCH" operation may be classified as shown in a following Table 14.

TABLE 14

| E Field | Function |
|---|---|
| 0 | If (S)∧M = 0 (FALSE), then<br>N → (RAR); branch to the address of N is executed<br>If (S)∧M≠ 0 (TRUE), then<br>(RAR) + 1 → (RAR); no branch is executed. |
| 1 | If the condition is FALSE, then<br>(RAR) + 1 → (RAR); no branch is executed.<br>If the condition is TRUE, then<br>N → (RAR); branch to the address of N is executed |

Two microsteps are taken at the execution of the "BRANCH" instruction. In order to read a next microinstruction, all "0" are loaded to the RDR from the BROM in response to the next clock signal generated after decoding the first word of the "BRANCH" instruction.

(12) JUMP instruction

The "JUMP" instruction comprises an operation code of "0110", a 2-bit extension (E) field and a 5-bit data (N) field. At the execution of the "JUMP" instruction, a branch operation is carried out in the same page comprising 32 words. When the contents of the E field are "00" and "10" those of the R1 in the IRS and the CC are respectively supplied to the first and the second operands of the ALU so that a logical multiplication is conducted therein on a bit-by-bit basis. If a result is equal to all "0", then it is referred to as FALSE. However, if the result is not all "0", then it is referred to as FALSE. The branch function of the "JUMP" instruction is defined by the FALSE/TRUE and the contents of the E field and the CN (counter register) as shown in a following Table 15.

TABLE 15

| E Field | FALSE/TRUE | Function |
|---|---|---|
| 00 | F | If (R1) ∧ (CC) = 0, then<br>N → RAR (6 − 10) without changing RAR (0 = 5) |
| | T | If (R1) ∧ (CC) ≠ 0 then<br>(RAR) + 1 → (RAR) |
| 01 | — | Unconditional branch;<br>N → RAR (6 = 10) |
| 10 | F | If (R1) ∧ (CC) = 0, then<br>(RAR) + 1 → (RAR) |
| | T | If (R1) ∧ (CC) ≠ 0, then<br>N → RAR (6 = 15) without changing RAR (0 = 5) |
| 11 | F | If (CN) = 0, then (RAR) − 1 → (RAR) |
| | T | If (CN) = 0, then N → RAR |

TABLE 15-continued

| E Field | FALSE/TRUE | Function |
|---|---|---|
| | | (6= 10) and (CN) + 1 → (CN) through ADD (See Fig. 2) |

When the branch operation is established, the microinstruction of all "0" are loaded to the RDR from the BROM.

Therefore, it takes two microsteps to execute the branch operation of the "JUMP" instruction. However, when the branch operation is not established, it takes only one microstep. In case the lower 5 bits of the address storing the JUMP instruction are "11111", the jump address may be located at the next page.

(13) FILL instruction

The "FILL" instruction comprises an operation code of "00010", a 2-bit destination (D) field and a 4-bit data (V) field.

When the "FILL" instruction is executed, the input gates of the CC, the FLG, and the PH and the PL of the IR are respectively enabled in response to the contents "00", "01", "10" and "11" of the D field, and the data of the V field are stored in one of the registers of the CC, the FLG, the PH or the PL through the I-BUS.

(14) FILL CN instruction

The "FILL CN" instruction comprises an operation code of "00011" and a 6-bit (V) field. At the execution of the "FILL CN" instruction, the data of the V field are stored in the CN through the I-BUS.

(15) IMMEDIATE LOAD instruction

The "IMMEDIATE LOAD" instruction comprises an operation code of "001" and an 8-bit data (V) field. When the "IMMEDIATE LOAD" instruction is executed, the contents of V field are loaded to the lower 8-bit positions of the A-register through the I-BUS after the lower half contents of the A-register are loaded to the higher half contents thereof.

(16) COMMAND instruction

The "COMMAND" instruction comprises an operation code of "0000" and a 7-bit extension (E) field. The instruction functions mainly to bite-exchange the A-register and to shift the contents the A-register and the B-register under the control of the control decoder. At the half-word shift operation, the contents of the A-register are shifted in accordance with the CN. The modes of shift operation are right/left shifts and logical/arithmetic shifts, which are designated by the contents of the PL field of the IR. At the full-word shift operation, the A-register is connected with the B-register and the shift operation is controlled by the contents of the CN. The modes thereof are right/left shifts and logical/arithmetic shifts and a logical rotate.

A multiply-mode-shift operation is executed by the combination of the "COMMAND" instruction and the "ADD" instruction following in the wake thereof, so that the contents of the A-register are multiplied by an operand designated to the "ADD" instruction. Namely, in the multiply-mode-shift operation, the A-register is connected with the B-register and the shift operation is carried out when the bit shifted out from the B-register is "0" while the "ADD" operation is executed when it is "1".

The lower 2 bits of the RAR after the execution of the "COMMAND" instruction are made clear or reset and then the operation is automatically returned to execute the "COMMAND" instruction until the contents of the CN are counted out. The "COMMAND" instruction is necessarily stored at the address of the CROM which are of the multiple of 4. However when a divide-mode-shift operation is executed, a dividend is loaded to the A-register and the B-register, and then the left shift is carried out so that the "ADD" operations (actually the "ADD" operation is changed to "SUBTRACT" operation in this case because the L bit of the FLG is of "1") and the shift operation are alternatively done in response to the value of the shifted-out bit. Then, the lower 2 bits of the RAR are made clear or reset and the control is returned to the execution of the "COMMAND" instruction until the contents of the CN are counted out.

(17) EXTERNAL REQUEST instruction

The "EXTERNAL REQUEST" instruction comprises an operation code of "0100000" and a 4-bit extension E field.

The "EXTERNAL REQUEST" instruction is used for a data transfer between the A-register and an external device, and a request to the controller connected to C-BUS. At the execution fo the "EXTERNAL REQUEST" instruction, the output gate of the A-register is enabled to provide the external device with data through the I-BUS or the input gate of the A-register is enabled to store data from the I-BUS under the control of the control decoder.

(18) DECODE instruction

The "DECODE" instruction comprises an operation code of "0100", a 3-bit extension (E1) field and a 4-bit extension (E2) field. The "DECODE" instruction used for a data transfer between the processor 100 and the main memory. Therefore, at the execution of the "DECODE" instruction, the macroinstructions (user's instruction) are supplied to the IR through the C-BUS and the I-BUS and the contents of the A-register are transmitted to the main memory.

According to this invention, the functions of the microinstructions are highly advanced in accordance with the extension field thereof in spite of the vertical type microprogram controlled system. Therefore, the number of the total microprogramming steps can be made so small that the operational performance of the system is significantly improved.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. A microprogram-controlled system comprising:
   (1) control storage means for storing microinstructions which includes an operation code field, an extension field and a register designation field in the format thereof, and
   (2) central processing means including;
       (a) microinstruction fetch control means for storing a next microinstruction address and data fetched from said control storage means;
       (b) arithmetic and logic means for executing parallel add and subtract operations, logical operations and shift operations in response to said microinstructions,
       (c) means for storing the output of said arithmetic and logic means,
       (d) an instruction register for storing macroinstructions, (e) general registers designated by said macroinstructions and indirectly designated by said microinstructions, (f) working registers utilized by said microinstructions, (g) a flag register for storing information on a carry, a borrow and a sign as a result of operations carried out in said central processing means, (h) a counter register for counting the number of said shift operations, (i) a control decoder for decoding said microinstructions and controlling said central processing means in order to execute said microinstructions, which includes means for selecting one of said registers as a designation register by combination of the predetermined contents of said extension field with those of said register designation field, and (j) an internal common bus connecting the microinstruction fetch control means, the arithmetic and logic means, the output storing means, the registers and the control decoder for communication in said central processing means.

2. A microprogram-controlled system according to claim 1, wherein said microinstructions are register-to-register type instructions for handling said designation register and said output storing means for said arithmetic and logic means.

3. A microprogram-controlled system according to claim 2, wherein:
the functions of said microinstructions are modified in accordance with the contents of said extension field under the control of said control decoder.

4. A microprogram controlled system according to claim 3, including:
means for selecting the predetermined contents of said designation register in accordance with those of said extension field in order to execute said add and subtract operations and said logical operations.

5. A microprogram-controlled system according to claim 4, wherein:
said designation register is designated as a source register for the operand of said operations, the contents of said output storing means and those of said source register being supplied to said arithmetic and logic means in order to carry out the arithmetic and logic operations therein, the result thereof being stored in said output storing means under the control of said control decoder.

6. A microprogram-controlled system according to claim 5, wherein:
said control decoder decodes said microinstructions and loads the full contents of said output storing means with the contents of said source register in accordance with the contents of said extension field.

7. A microprogram-controlled system according to claim 5, wherein:
said control decoder decodes said microinstructions and loads half of the contents of said output storing means with those of said source register in accordance with the contents of said extension field.

8. A microprogram-controlled system according to claim 5, wherein:
said control decoder decodes said microinstructions and keeps the upper half of the contents of said output storing means unchanged in accordance with the contents of said extension fields.

9. A microprogram-controlled system according to claim 5, wherein:
said control decoder decodes said microinstructions and loads the upper half of the contents of said output storing means with the lower half contents thereof in accordance with the contents of said extension field.

10. A microprogram-controlled system according to claim 5, wherein:
said output storing means includes a first operation register and a second operation register for an auxiliary of said first operation register.

11. A microprogram-controlled system according to claim 10, wherein:
said control decoder designates said add operations of the contents of said source register to those of said operation registers, said operaton registers to store the added data from said arithmetic and logic means and the contents of said flag register to be handled in accordance with the contents of said extension field.

12. A microprogram-controlled system according to claim 10, wherein:
said control decoder designates said subtract operations of the contents of said operation registers from those of said source register, said operation registers to store the subtracted data from said arithmetic and logic means and the contents of said flag register to be handled in accordance with the contents of said extension field.

13. A microprogram-controlled system according to claim 10, wherein:
said control decoder designates said subtract operations of the contents of said source register from those of said operation registers, said operation registers to store the subtracted data from said arithmetic and logic means and the contents of said flag register to be handled in accordance with the contents of said extension field.

14. A microprogram-controlled system according to claim 10, wherein:
said control decoder designates the logical AND operations of the contents of said source register and those of said operation register, and the contents of said flag register to be handled in accordance with the contents of said extension field.

15. A microprogram-controlled system according to claim 10, wherein:
said control decoder designates the logical OR operations of the contents of said source register and those of said operation registers, and the contents of said flag register to be handled in accordance with the contents of said extension field.

16. A microprogram-controlled system according to claim 10, wherein:
said control decoder designates the logical EXCLUSIVE OR operations of the contents of said source register and those of said operation register, and the contents of said flag register to be handled in accordance with said extension field.

17. A microprogram-controlled system according to claim 4, wherein:
said designation register is designated as a destination register to which the contents of said output storing means are given under the control of said control decoder.

18. A microprogram-controlled system according to claim 17, wherein:

said decoder decodes said microinstructions and transfers the full data of said output storing means to said destination register in accordance with the contents of said extension field.

19. A microprogram-controlled system according to claim 17, wherein:
said control decoder decodes said microinstructions and transfer half of the contents of said output storing means to those of said destination register in accordance with the contents of said extension field.

20. A microprogram-controlled system comprising:
(1) control storage means for storing microinstructions which include register-to-register type instructions, immediate type instructions, command type instructions, external manipulation type instructions, jump type instructions and branch type instructions, said register-to-register type instruction having an extension field and designation field in the format thereof, said immediate type instructions having a data field in the format thereof, said command type instructions having an extension field in the formal thereof, said external manipulation type instructions having an extension field in the format thereof, said jump type instructions having an extension field, a bit-pattern field and a jump-address field in the format thereof, said branch type instructions having an extension field, a bit-pattern field and a branch address field in the format thereof,
(2) central processing means including:
(a) a microinstruction-fetch control circuit for storing a next microinstruction address and data fetched from said control stage means,
(b) an arithmetic and logic unit for executing parallel add/subtract operations, logical operations and shift operations in response to said microinstructions,
(c) means for storing the output of said arithmetic and logic means, said output storing means including a first operation register and a second operation register for an auxiliary of said first operation register, means for loading the lower half bit positions of said first operation register with the contents of said data field of said immediate type instructions; and means for providing the higher half bit positions of said first operation register with the previous data of the lower half bit positions thereof under the control of said control decoder,
(d) an instruction register for storing macroinstructions,
(e) general registers designated by said macroinstructions and indirectly designated by said microinstructions,
(f) working registers utilized by said microinstructions,
(g) a flag register for storing information on a carry, a borrow and a sign as a result of operations carried out in said central processing means,
(h) a counter register for counting the number of said shift operations,
(i) a control decoder for decoding said microinstructions so as to control said central processing means, and
(j) an internal common bus connecting the microinstruction fetch control circuit, the arithmetic and logic unit, the output storing means, the registers, and the control decoder for communication in said central processing means.

21. A microinstruction-controlled system according to claim 20, including:
means for storing information supplied externally of said central processing means;
means for comparing said external information with said bit-pattern field of said branch type instructions; and
means for setting the contents of said circuit for storing a next microinstruction address in response to a result provided from said comparing means and the contents of said extension field of said branch type instructions.

22. A microprogram-controlled system according to claim 20, wherein said branch type instructions further have a course field in the format thereof, and said central processing means includes:
means for comparing the contents of said source register designated by said source field with those of said bit-pattern thereof; and
means for providing said circuit for storing a next microinstruction address with said branch address in response to the contents of said extension field of said branch type instructions and a result supplied from said comparing means.

23. A microprogram-controlled system according to claim 20, wherein said central processing means includes:
a condition code register for storing control information of macroinstruction level,
means for comparing the contents of said condition code register with those of the predetermined field of said instruction register, and
means for providing said circuit for storing a next microinstruction address with said jump address in response to the contents of said extension field of said jump type instructions and the result provided from said comparing means.

24. A microprogram-controlled system according to claim 20, wherein said central processing means includes:
a condition code register for storing control information at the macroinstruction level, said immediate type instructions further having a destination field in the format thereof which designates said condition code register, said flag register and a predetermined field of said instruction register as a destination register; and
means for providing said destination register with the contents of said data field of said immediate type instructions.

25. A microprogram-controlled system according to claim 20, including means for setting a shift mode of said first operation register in accordance with the contents of said extension field of said command type instruction and those of said instruction register.

26. A microprogram-controlled system according to claim 25, wherein said central processing means includes:
means for connecting said first operation register with said second operation register at the execution of said shift operations of said command type instructions.

27. A microprogram-controlled system according to claim 26, wherein said central processing means includes:

means for enabling said shift operations of the contents of said operation registers to the right direction on a bit-by-bit basis, means for continuing said shift operation when the bit shifted out from said first operation register is of a predetermined value, means for enabling the following execution of said all operations when the bit shifted out from said first operation register is not the predetermined value; and means for repeating said command type instruction until said counter register counts to the predetermined value.

28. A microprogram-controlled system according to claim 26, wherein central processing means includes:

means for enabling said shift operations of the contents of said first and said second operation registers to the left direction on a bit-by-bit basis, means for continuing said shift operation when the bit shifted out from said first operation register is of a predetermined value, means for enabling the following execution of said subtract operations when the bit shifted out from said first operation register is not the predetermined value, and means for repeating said command type instruction until said counter register counts up to a predetermined value.

* * * * *